United States Patent [19]

Cullen

[11] Patent Number: 5,297,377
[45] Date of Patent: Mar. 29, 1994

[54] DENSITY CONTROL MEANS FOR AN AGRICULTURAL FEED BAGGING MACHINE

[76] Inventor: Steven R. Cullen, Rte. 1, Box 642, Astoria, Oreg. 97103

[21] Appl. No.: 3,540

[22] Filed: Jan. 13, 1993

Related U.S. Application Data

[63] Continuation-in-part of Ser. No. 912,873, Jul. 13, 1992.

[51] Int. Cl.$^5$ ............................................. B65B 1/24
[52] U.S. Cl. ..................................... 53/527; 53/255; 53/529; 53/567; 53/576; 100/100; 100/144; 141/73
[58] Field of Search ................ 141/71, 73, 114; 100/65, 100, 144, 212; 53/255, 257, 260, 527, 529, 530, 567, 576

[56] References Cited

U.S. PATENT DOCUMENTS

| | | | |
|---|---|---|---|
| 2,294,440 | 9/1942 | Barker | 100/100 |
| 2,552,888 | 5/1951 | Druetta | 100/100 |
| 2,646,913 | 10/1951 | Goldberg et al. | 226/45 |
| 3,687,061 | 8/1972 | Eggenmuller et al. | 100/65 |
| 3,791,593 | 2/1974 | Griffin | 100/100 |
| 4,046,068 | 9/1977 | Eggenmuller et al. | 100/65 |
| 4,102,109 | 7/1978 | Modra et al. | 53/24 |
| 4,256,031 | 3/1981 | Ryan | 100/65 |
| 4,308,901 | 1/1982 | Lee | 100/100 X |
| 4,310,036 | 1/1982 | Rasmussen et al. | 141/114 |
| 4,337,805 | 7/1982 | Johnson et al. | 141/71 |
| 4,502,378 | 3/1985 | Cullen | 100/65 |
| 4,567,820 | 2/1986 | Munsell | 100/65 |
| 4,572,064 | 2/1986 | Burton | 100/212 X |
| 4,621,666 | 11/1986 | Ryan | 141/114 |
| 4,653,553 | 3/1987 | Cox et al. | 100/65 |
| 4,688,480 | 8/1987 | Ryan | 100/144 |
| 4,724,876 | 2/1988 | Ryan | 141/114 |
| 4,788,901 | 12/1988 | Klinner et al. | 100/100 |
| 4,945,715 | 8/1990 | Brodrecht | 53/567 |
| 4,949,633 | 8/1990 | Johnson et al. | 100/65 |
| 5,159,877 | 11/1992 | Inman et al. | 100/65 X |

*Primary Examiner*—John Sipos
*Assistant Examiner*—Daniel Moon
*Attorney, Agent, or Firm*—Zarley, McKee, Thomte, Voorhees & Sease

[57] ABSTRACT

An agricultural bagging machine is disclosed which includes a plurality of horizontally disposed and vertically spaced cables positioned at the rearward end of the tunnel of the machine. The cables are dragged through the silage being bagged as the bagging machine moves away from the closed end of the bag so that the proper amount of density is created in the material being bagged. Each of the cables defines a cable loop which extends rearwardly from the output end of the tunnel into the open end of the bag. The lengths of the cables may be adjusted to permit the density to be controlled. The number of cables may also be varied to control the density in various types of silage materials.

14 Claims, 3 Drawing Sheets

DENSITY CONTROL MEANS FOR AN AGRICULTURAL FEED BAGGING MACHINE

CROSS REFERENCE TO RELATED APPLICATION

This is a continuation-in-part to application Ser. No. 07/912,873 entitled "A DENSITY CONTROL MEANS FOR AN AGRICULTURAL FEED BAGGING MACHINE," filed Jul. 13, 1992.

BACKGROUND OF THE INVENTION

1. Field of the Invention

This invention relates to an agricultural feed bagging machine and more particularly to an agricultural feed bagging machine having means associated therewith to control the density of the material being packed in the bag without the need for a backstop and cable brakes.

2. Background Information

Agricultural feed bagging machines have been employed for several years to pack or bag silage or the like into elongated plastic bags. Two of the earliest bagging machines are disclosed in U.S. Pat. Nos. 3,687,061 and 4,046,068. In the prior art bagging machines, silage or the like is supplied to the forward or intake end of the bagging machine and is fed to a rotor which conveys the silage into a tunnel on which the bag is positioned so that the bag is filled. As silage is loaded into the bag, the bagging machine moves away from the filled end of the bag in a controlled fashion so as to achieve uniform compaction of the silage material within the bag. In U.S. Pat. No. 4,337,805, silage is forced by means of a rotor from the intake chamber of the machine through the output chamber of the machine and into the agricultural bag with a backstop structure yieldably engaging the closed end of the agricultural bag to resist the movement of the bagging machine away from the filled end of the agricultural bag as silage is forced into the bag. The structure of the '805 patent includes a pair of drums rotatably mounted on the bagging machine with a brake associated therewith for braking or resisting the rotation of the drum with a selected brake force. A cable is wrapped around the drum and is connected to the backstop.

Although the cable drum and backstop structure of the '805 patent and other similar machines do function generally satisfactorily, the cables, which are positioned on opposite sides of the bag, can create openings or holes in the bag which will adversely effect the fermentation process within the bag. A further disadvantage of the cable drum and backstop structure of the devices such as shown in the '805 patent is that the cables must be rewound after the filling of an individual bag. A further disadvantage of the cable drum and backstop structure of the machine such as disposed in the '805 patent is that a dangerous condition exists should one of the cables break.

In an effort to overcome some of the disadvantages of machines such as disclosed in the '805 patent, an attempt was made in U.S. Pat. No. 4,621,666 to achieve the desired bagging operation while eliminating the need for the cable drum and backstop structure. In the '666 patent, the wheels on the bagging machine were braked to provide the desired resistance to the filling of the bag. Although the brake system of the '666 patent apparently met with some success, it is believed that machines such as disclosed in the '666 patent experience slippage difficulties in wet field conditions which adversely effect the bagging operation. It is also believed that the brake means alone on the bagging machine such as those disclosed in the '666 patent do not achieve the desired compaction of the silage material within the bag.

In applicant's co-pending application, a bagging machine is described which has the capability of enabling the density of the silage material to be selectively controlled without the need of an elaborate braking system. Although the bagging machine of the co-pending application does satisfactorily achieve all of its objectives, a more simple way of controlling the density of the bagged material has been discovered and is believed to represent a significant advance in the prior art and a significant advance over the bagging machine of the co-pending application.

SUMMARY OF THE INVENTION

An agricultural feed bagging machine is disclosed which comprises a wheeled frame having rearward and forward ends. A tunnel is provided on the wheeled frame and has an intake end for receiving silage material and an output end adapted to receive the mouth of an agricultural bag. A hopper is provided on the wheeled frame for receiving the silage material and is adapted to supply the same to a rotatable rotor which forces the silage into the tunnel means and into the bag. The density control means of this invention is positioned rearwardly of the rotor and comprises a plurality of horizontally disposed and vertically spaced cables which are secured to the tunnel and which extend rearwardly therefrom into the open end of the bag. The cables are in the path of the silage material being bagged and are dragged through the silage material causing the material in the tunnel to be packed thereby eliminating the need of a conventional backstop and cable drum arrangement. Preferably, the rearward ends of the loops of the cables are approximately two to four feet behind the tunnel back edge so that the feed is not only packed therein but the gross amount of feed between the cables and the machine act as an anchor thus requiring very little wheel brakes, if any, for fine adjustment. The lengths of the cables are adjustable to enable the density of the material to be controlled.

It is therefore a principal object of the invention to provide an improved agricultural feed bagging machine.

A further object of the invention is to provide an agricultural bagging machine having means at the output end of the tunnel for increasing the density of the silage material being forced through the tunnel into the bag.

A further object of the invention is to provide a density control means for an agricultural feed bagging machine including a plurality of horizontally disposed and vertically spaced cables which extend rearwardly from the tunnel into the mouth of the bag.

Yet another object of the invention is to provide an agricultural bagging machine having means at the output end of the tunnel for increasing the density of the silage material being forced through the tunnel into the bag with that means being adjustable to enable the machine to compensate for different types of silage materials being bagged.

Yet another object of the invention is to provide a plurality of horizontally disposed and vertically spaced cables at the output end of the tunnel for increasing the density of the silage material being forced through the tunnel into the bag with at least one end of each of the cables being removably secured to the tunnel so that the cables may be released to enable the tunnel to clean itself when the end of the bag has been reached.

These and other objects of the invention will be apparent to those skilled in the art.

DESCRIPTION OF THE PREFERRED EMBODIMENT

Figure 1:
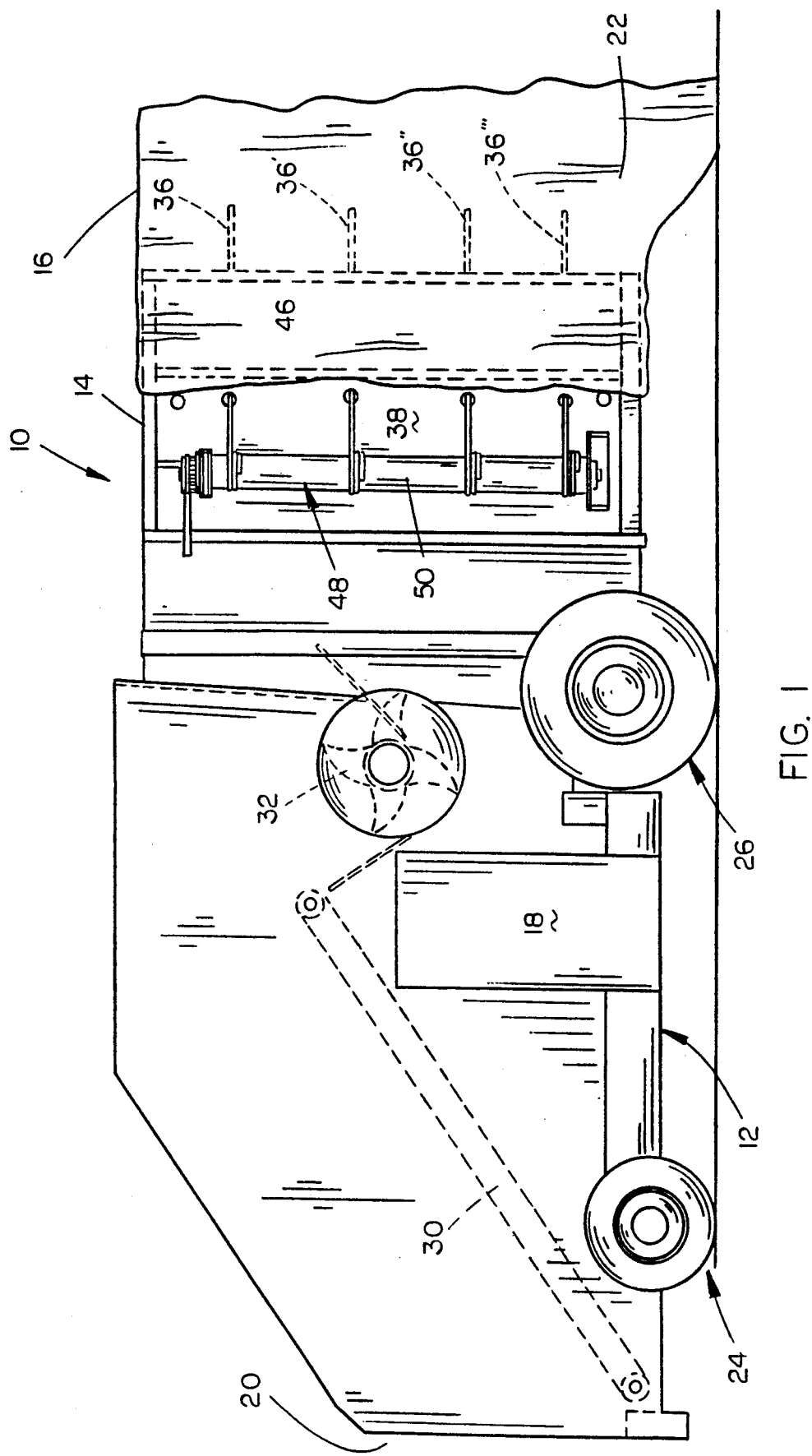
FIG. 1 is a side elevational view of the bagging machine of this invention.
Figure 2:
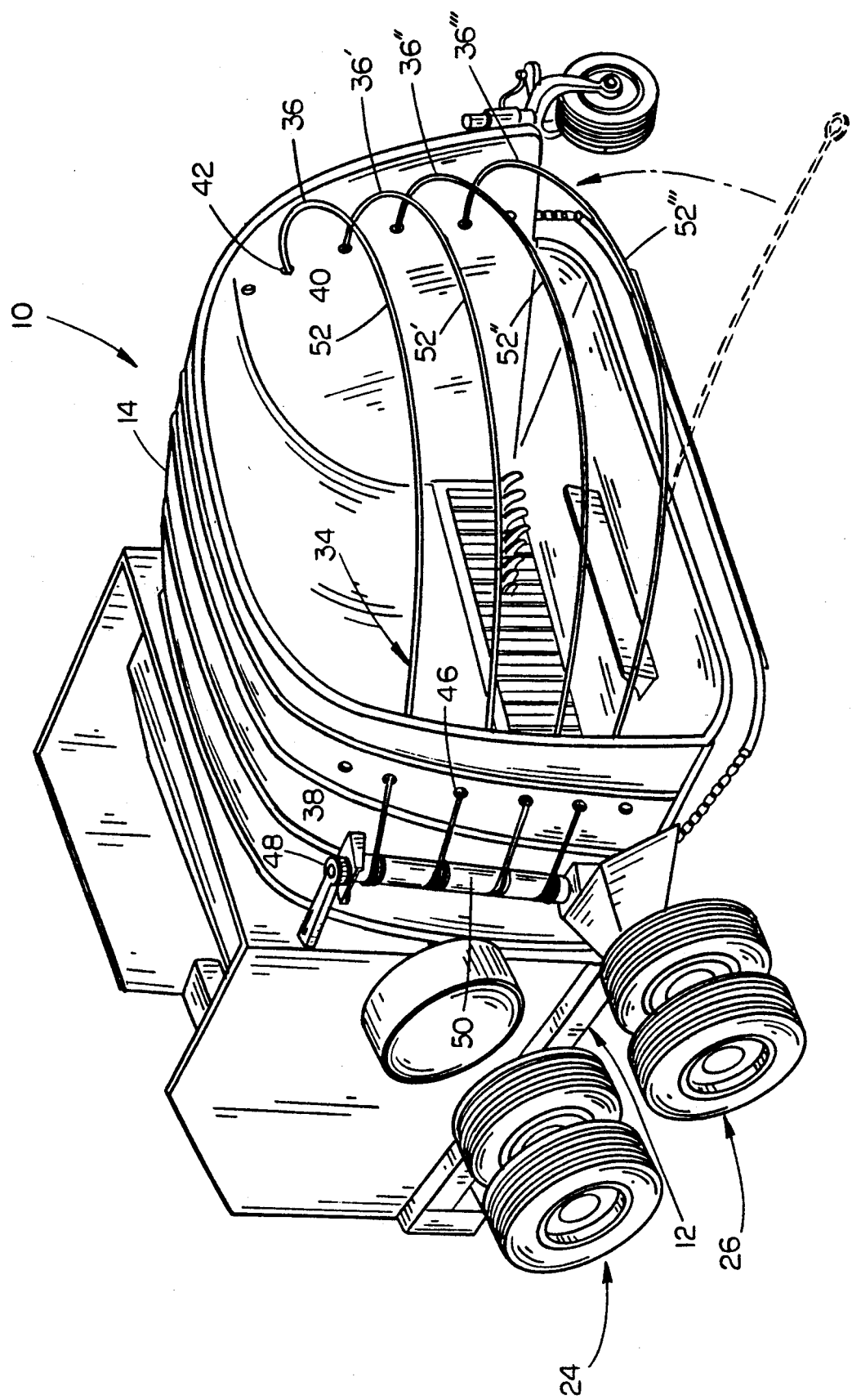
FIG. 2 is a rear perspective view of the bagging machine.
Figure 3:
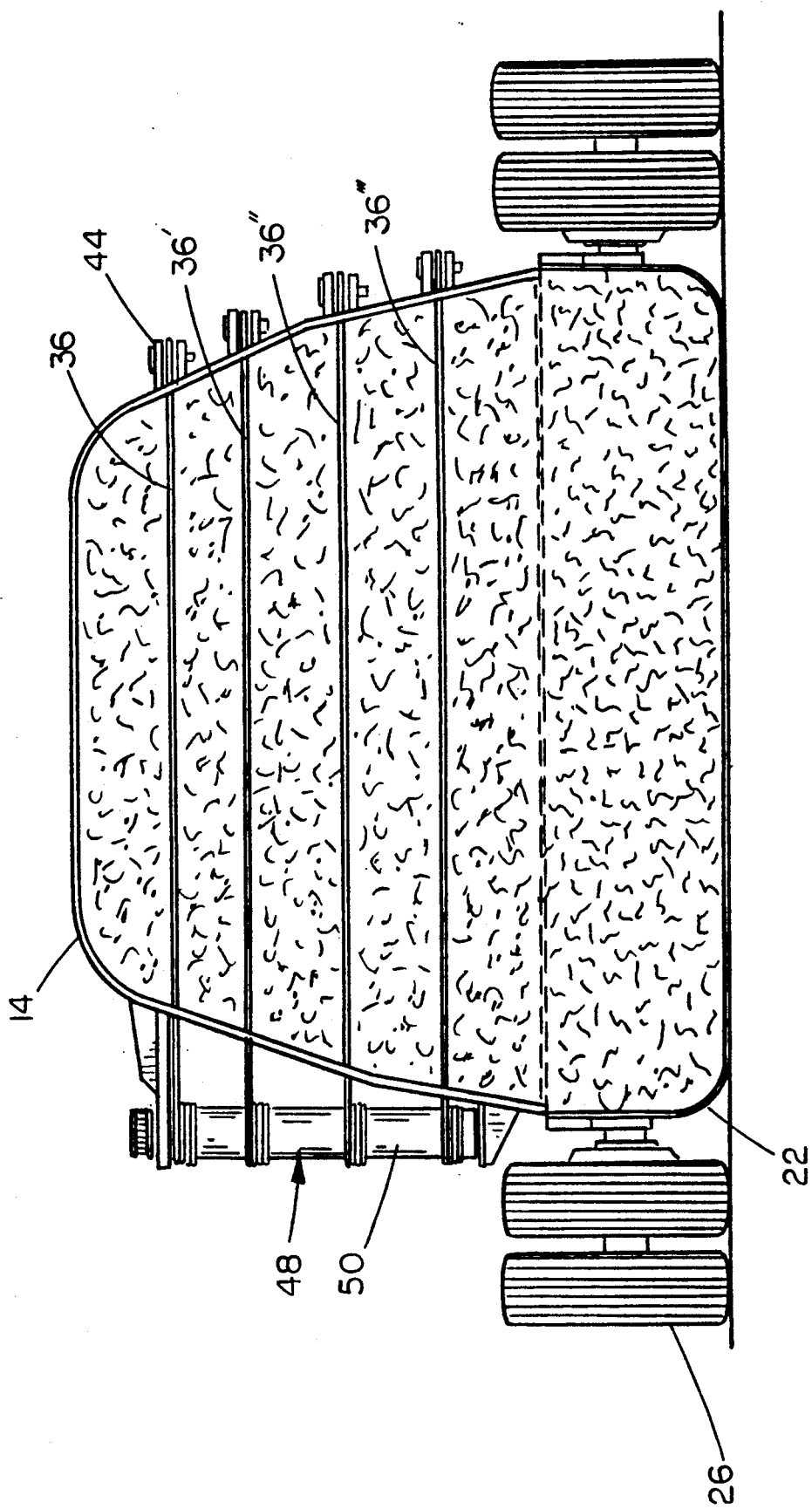
FIG. 3 is a rear view of the bagging machine.

The bagging machine of this invention is referred to generally by the reference numeral 10 and is of the type disclosed in my co-pending application, Ser. No. 07/912,873 filed Jul. 13, 1992, which discussed the co-pending application Ser. No. 879,789 filed May 6, 1992 which was a continuation-in-part application of Ser. No. 815,942 filed Dec. 30, 1991, the disclosures of which are relied upon to complete this disclosure. Machine 10 includes a wheeled frame means 12 having a tunnel 14 mounted thereon upon which is normally positioned the open mouth of an agricultural bag 16 as illustrated in FIG. 1. For purposes of conciseness, the power means for driving the various components of the machine have not been disclosed since the same does not form a part of the invention. However, the reference numeral 18 refers schematically to the location where the power means for the machine would be located. The bagging machine may take many forms. However, all bagging machines will include a rotor and a tunnel.

For purposes of description, the bagging machine 10 will be described as including a forward end 20 and a rearward end 22. Also for purposes of description, the wheeled frame means 12 of the bagging machine 10 will be described as including a pair of front wheels 24 and a pair of rear wheels 26. Preferably, the rear wheels 26 would include wheel brakes associated therewith such as disclosed in U.S. Pat. No. 4,621,666. Wheel brakes such as described in the '666 patent are operatively associated with the wheels 26 for loading the wheels to a predetermined setting to resist the movement of the bagging machine 10 away from the closed end of the bag 16 as the bag 16 is being filled. Although it is preferred that wheel brakes be associated with the bagging machine, wheel brakes are not believed to be necessary in certain bagging situations. However, it would be prudent to include wheel brakes on the machine so that they could be utilized, if necessary.

Bagging machine 10 includes a hopper 28 at the forward end thereof which is adapted to receive silage material or the like from a truck, wagon, etc. The design of the hopper 28 does not form a portion of the invention and may take many shapes. In the embodiment seen in FIG. 1, a feed table 30 is provided for conveying the silage material upwardly and rearwardly to the rotor 32 which is located at the forward end of the tunnel 14 and which is designed to be rotated in a counterclockwise direction as viewed in FIG. 1 to force silage from the hopper 28 into the tunnel 14 and into the bag 16. The density control means of this invention is referred to generally by the reference numeral 34.

The density control means 34 includes at least one cable 36 which is secured to and extends between the sides 38 and 40 of the tunnel 14. The number of cables 36 which will be employed will depend upon the material being bagged. For example, fewer cables will be required in alfalfa-type feeds and with more cables being required in corn-type feeds. In the drawings, four cables are illustrated with the numbers 36, 36' 36" and 36'" being employed to designate those cables. The cables 36, 36', 36" and 36'" are preferably comprised of a flexible steel material such as commonly used as braking cables in the prior art bagging machines.

One end of each of the cables 36, 36', 36" and 36'" extends outwardly through suitable openings 42 formed in side 40 of tunnel 14. The ends of the cables are removably secured to connectors 44 mounted on the outer surface of side 40 of tunnel 14. The other ends of the cables 36, 36', 36" and 36'" extend outwardly through suitable openings 46 formed in side 38 of tunnel 14 and are secured to an adjustable cable take-up assembly or wind-up assembly 48. Preferably, the cables 36, 36', 36" and 36'" extend through the sides 38 and 40 of tunnel 14 at approximately the middle of its length although they may extend through the tunnel near the rearward end. The cables 36, 36', 36" and 36'" are secured to rotatable shaft 50 of assembly 48 whereby selective rotation of the shaft 50 will either cause the cables to be unwound from the shaft 50 or wound thereupon.

As seen in the drawings, the cables 36, 36', 36" and 36'" define or form cable loop portions 52, 52', 52" and 52'" at their rearward ends which are preferably positioned rearwardly of the rearward end of the tunnel 14 and which are received by the open mouth of the bag 16 as depicted in FIG. 1. Preferably, the cable loop portions 52, 52', 52" and 52'" extend approximately 2-4 feet rearwardly of the tunnel 14.

The horizontally disposed and vertically spaced cables 36, 36', 36" and 36'" are dragged or pulled through the silage material or feed as the rotor of the bagging machine forces the material rearwardly through the tunnel 14 into the bag 16 causing a pack or compaction in the tunnel 14 thereby eliminating the need for a backstop such as the backstop 214 shown in U.S. Pat. No. 4,949,633.

Inasmuch as the cable loop portions 52, 52', 52" and 52'" are approximately 2-4 feet behind the back or rearward end of tunnel 14, the feed or silage material is not only packed into the bag 16 but the gross amount of silage material between the cables 36, 36' 36", 36'" and the machine, acts as an anchor thus requiring very little wheel braking, if any, for fine adjustment. In certain situations, wheel braking will not be necessary as the machine will function without brakes. However, as stated, it is preferred that the machine be equipped with conventional wheel brakes for those situations where braking action is required.

Thus, in operation, the feed is packed internally in the tunnel 14 between the cables and the rotor 32 to achieve the desired density of the material in the bag 16. That density may be controlled by varying the number of cables which are employed and/or by varying the position of the rearward end of the cable loop portions.

When the bag 16 is finished, the operator simply unhooks one end of the cable, preferably the ends which are secured to the connectors 44, and pulls the cables out of the tunnel 14 so that when the machine is driven forwardly, the feed will come out of the tunnel and be left in the end of the bag 16. Thus, the disconnection of the cables and their removal from the tunnel 16 serves to enable the tunnel to be "cleaned out" without the necessity of manually cleaning the same.

Thus, it can be seen that a novel density control means has been provided for a bagging machine which accomplishes at least all of its stated objectives. The density control means of this invention increases and controls the density of the material being forced through the tunnel 14 into the bag 16 to eliminate the need for the conventional backstop and cable arrangement found in most prior art machines. Further, the density control means of this invention eliminates, or greatly reduces, the amount of wheel braking action which is required to pack the material into the bag. Further, the density control means of this invention, by positioning vertically spaced cables in the path of the material being forced into the bag, is believed to ensure that the density of the material in the bag will be uniform from the top to the bottom of the bag 16.

I claim:

1. An agricultural bagging machine for bagging agricultural material into agricultural bags having a closed end and an open mouth comprising,
    a wheeled frame having rearward and forward ends,
    a tunnel on said wheeled frame and having an intake end for receiving the material to be bagged and an output end adapted to receive the open mouth of the agricultural bag, said tunnel having opposite sides,
    a hopper on said wheeled frame forwardly of said tunnel for receiving the material to be bagged,
    a horizontally disposed rotor rotatably mounted on said wheeled frame at the intake end of said tunnel for forcing the material to be bagged from said hopper into said tunnel and into said bag,
    means for rotating said rotor,
    and a density control means extending between the opposite sides of said tunnel within the agricultural bag for engagement with the material being bagged to control the density of the material as the material is forced past said density control means and further into the agricultural bag.

2. The bagging machine of claim 1 wherein said wheeled frame includes a brake means.

3. The bagging machine of claim 1 wherein said density control means comprises an adjustable means for selectively varying the density of the material being forced through said tunnel into the bag.

4. The bagging machine of claim 3 wherein a brake means is operatively associated with said wheeled frame for resisting movement of the bagging machine away from said closed end of the bag.

5. The bagging machine of claim 1 wherein said density control means is at the output end of said tunnel and comprises at least one horizontally disposed cable extending between the opposite sides of said tunnel.

6. The bagging machine of claim 5 wherein one end of said cable is removably secured to one of said sides of said tunnel.

7. The bagging machine of claim 5 wherein said cable is flexible.

8. The bagging machine of claim 5 wherein up to six cables extend between the opposite sides of said tunnel.

9. The bagging machine of claim 5 wherein a plurality of horizontally disposed and vertically spaced cables extend between the opposite sides of said tunnel.

10. The bagging machine of claim 9 wherein one end of each of said cables is removably secured to one of said sides of said tunnel.

11. The bagging machine of claim 9 wherein each of said cables forms a rearwardly extending cable loop which extends from the output end of said tunnel approximately two to four feet into the open mouth of the bag.

12. The bagging machine of claim 5 wherein said cable forms a rearwardly extending cable loop which extends rearwardly from the output end of said tunnel into the open mouth of the bag at an adjustable length.

13. The bagging machine of claim 12 wherein a length of said cable is adjustable to adjust the extension of said cable loop into the bag.

14. The bagging machine of claim 12 wherein said cable loop has forward ends which are secured to said tunnel approximately at a center length thereof.

* * * * *